Feb. 24, 1959     P. L. MILLER, SR     2,874,530
GARDEN RAKE WITH ATTACHMENT FOR CLEANING THE TEETH THEREOF
Filed June 7, 1957
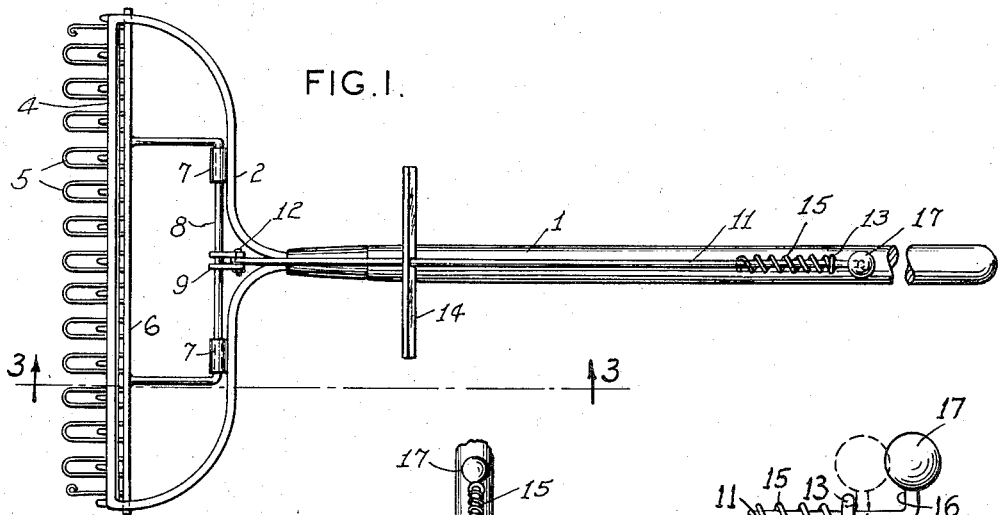
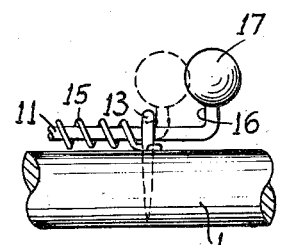
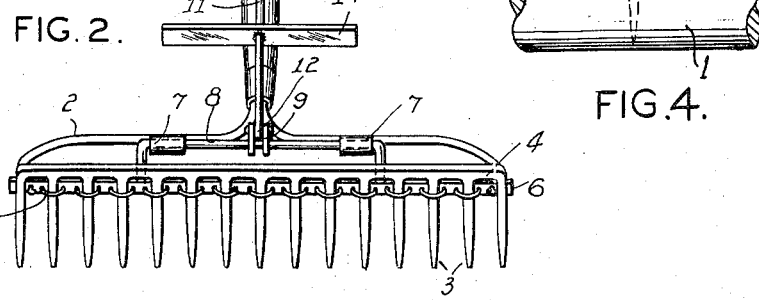
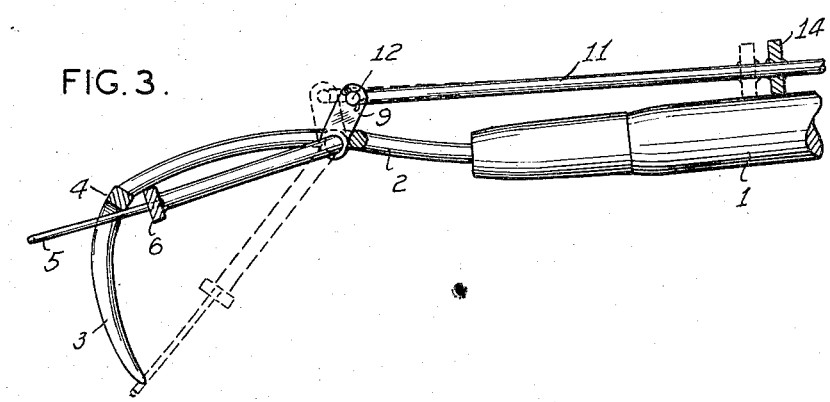
INVENTOR
PHILIP L. MILLER, SR.
BY: Ben V. Zillman
ATTORNEY

United States Patent Office 2,874,530
Patented Feb. 24, 1959

2,874,530
GARDEN RAKE WITH ATTACHMENT FOR CLEANING THE TEETH THEREOF

Philip Lambert Miller, Sr., Florissant, Mo.

Application June 7, 1957, Serial No. 664,350

1 Claim. (Cl. 56—400.1)

The invention relates to hand-manipulated garden tools in the general class of rakes, but more particularly to such a rake that has a built-in attachment whereby grass or other material that has been raked up and is clinging to the rake may be quickly and immediately forced off the rake by a simple manipulation of said attachment.

The invention has among its general objects the production of such a device that is simple and sturdy in its construction, economical to make, simple to use, and which will be otherwise satisfactory and efficient for use wherever deemed applicable.

One of the principal objects of my invention is to so construct said rake that it may be used in the normal maner to rake up grass and other waste material from the lawn, and then said material may be wiped or pulled off the rake teeth by a simple and conveniently operable stripping attachment that is mounted on the rake.

Another object of the invention is to so construct said rake cleansing attachment that the same may be operated by either hand or foot, as found most convenient by the user.

Many other objects and advantages of the construction herein shown and described, will be obvious to those skilled in the art to which this invention appertains, all as will be more clearly evident from disclosures hereinafter given.

To this end, my invention consists in the novel construction, arrangement and combination of parts herein shown and described, and the uses mentioned, all to be more clearly pointed out in the claim hereunto appended.

In the drawings, wherein like reference characters represent like or corresponding parts throughout the views, Figure 1 is a top plan view of the device, with a portion of the intermediate length of handle broken away;

Figure 2 is an elevational view of the same, as viewed from in front;

Figure 3 is a cross-sectional detail, taken substantially along the line 3—3 of Fig. 1; and Figure 4 is a fragmentary detail showing the rearmost end of the push rod and its association with the handle.

Referring more particularly to the drawings, wherein I have shown a preferred embodiment of my invention, 1 indicates the generally elongated handle of the common variety of garden hand rake, having a cross frame fixedly carried at one end thereof, said cross-frame having a pair of side arms 2—2 diverging forwardly from the connection with said handle.

The rake proper comprises a series of aligned teeth or tines 3—3 that extend at an angle to the horizontal plane through the axis of said handle, approximately at an angle of 90°, and there is a cross arm 4 carrying said tines at spaced-apart intervals therealong, said cross arm being preferably of one piece with the forward ends of the side arms, somewhat as shown. All of the foregoing is well-known and old construction in the art.

The general manner of using such a rake is to draw the teeth along the lawn, whereupon the grass and other matter is drawn into the teeth and clings to the same, so that it is necessary to remove said raked material by pulling the said material by hand from its lodgement in said teeth. This is a disagreeable task to most people, and might even cause the fingers to be cut in the event that glass particles or other similarly sharp waste material had become embedded in the grass that had been raked up.

In order to remove said waste material conveniently, rapidly, safely and with the utmost ease and simplicity, I have provided auxiliary means to said rake structure, said means being operable with either hand or either foot, as will now be set forth.

A series of loops or fingers 5 are mounted to be swingable generally lengthwise of and between said tines so that each such loop surrounds or bounds a tooth, all such loops being carried by a cross piece 6 to their rears, said cross piece being preferably longer than the spacing apart between the outermost ends of said side arms, so that in normal inoperative position the ends of the cross piece project slightly to either side of said arms to abut their under surfaces at the upper limit of travel of the cross piece, as indicated in the Fig. 3 of the drawings.

The loops are preferably elongated and of such length between front and rear ends that when they are in inoperative position, as indicated in Figs. 1 and 3, their rear ends will be slightly to the rear of said tines and their forward ends will then be spaced well in advance of the front surfaces of the tines.

Obviously, when the loops are swung downwardly from a suitably located pivotal axis spaced beyond their rears, as seen in the drawings, said loops travel through an arc, the said forward ends of the loops progressively approaching said tines, and they will be very close thereto at their lower limit of swing, whereby they will wipe off material from said tines from a prior raking operation, as indicated in dotted lines in Fig. 3.

In order to attain the proper path of arcuate travel, a rear portion 8 of said cross piece is journalled at 7—7, parallel to its front portion, to said side arms.

An offset 9 is carried by said axle portion 8 so as to project at an angle therefrom, and in effect acts as a crank arm.

In order to conveniently manipulate and control the movement of said loop structure, a push rod 11 is pivotally affixed at one of its ends, as at 12, to the outermost end of said crank arm, and has its other end slidably received through an eye 13 carried by said handle, so that said rod extends longitudinally along said handle.

Now, when said rod is actuated forwardly, toward said fork member, said loops are actuated to swing in an arc, to thereupon dislodge any waste material that may have become embedded on and between said rake teeth, the closed ends of said loops progressively approaching the opposed faces of said teeth as the loops are swung downwardly.

A foot plate 14 may be carried on said push rod, conveniently close to the fork for proper manipulation, said plate extending both to the right and left of said handle, so that either foot may be used to operate the clean-out attachment.

A spring, or other yieldably resilient element 15, may be carried between said rod and eye, so that actuation of said clean out attachment to operate the latter will be yieldably resisted by said spring, so that upon release of said operating force or pressure, said spring will retrieve the movable parts to their normal inoperative positions.

Another stop means to limit operative shift of said rod may be used, as for example by an offset 16 at a predetermined distance rearwardly beyond the said eye, and extending at an angle from said adjacent portion of said rod.

It might sometimes be more convenient or desirable to manipulate the clean-out by hand, rather than by the foot, and in this case, a knob 17 may be carried by said offset portion 16 of said push rod.

From the foregoing, it will be seen that the clean-out may be operatively manipulated either by pressing a foot against the foot plate, or by pushing the knob or hand grip forwardly, as seems most convenient to the user at the time, so that after either manner of operation the parts will be retrieved to their normal inoperative relation by the spring after the force actuating said clean out has been released.

I claim:

The combination with a garden rake having an elongated handle carrying a cross-frame at one end thereof provided with a series of aligned tines extending at angles to said handle, of a resiliently yieldable push-rod slidably mounted on said handle; bearings secured to said cross-frame at opposite sides of said handle; a rockable axle provided with forwardly extending arms journalled in said bearings, the said axle having a crank arm of the first class secured thereto intermediate the ends thereof, an end of said push rod being pivotally attached to the free end of said crank arm; a cross-piece exceeding the width of said rake secured to the arms of said axle, and elongated loops carried by said cross-piece, there being a single loop encircling each tine of said rake, whereby upon actuation of said push-rod in a forward direction the force applied to said crank arm will cause the rockable axle to move in an anti-clockwise direction carrying with it the elongated loops attached to said cross-piece and thereby free the tines of said rake of waste material and whereby the ends of said cross-piece will abut the cross frame of said rake to the rear of said tines and thereby act as a stop when said push rod is actuated in a reverse direction.

References Cited in the file of this patent

UNITED STATES PATENTS

| | | |
|---|---|---|
| 1,126,273 | Restetsky | Jan. 26, 1915 |
| 1,140,663 | Byram | May 25, 1915 |
| 1,442,615 | Humphrey | Jan. 16, 1923 |
| 1,879,112 | Cress | Sept. 27, 1932 |